(No Model.)
J. W. GEYER.
ROCKING TOOTHED HARROW AND LEVELER.
No. 347,791. Patented Aug. 24, 1886.
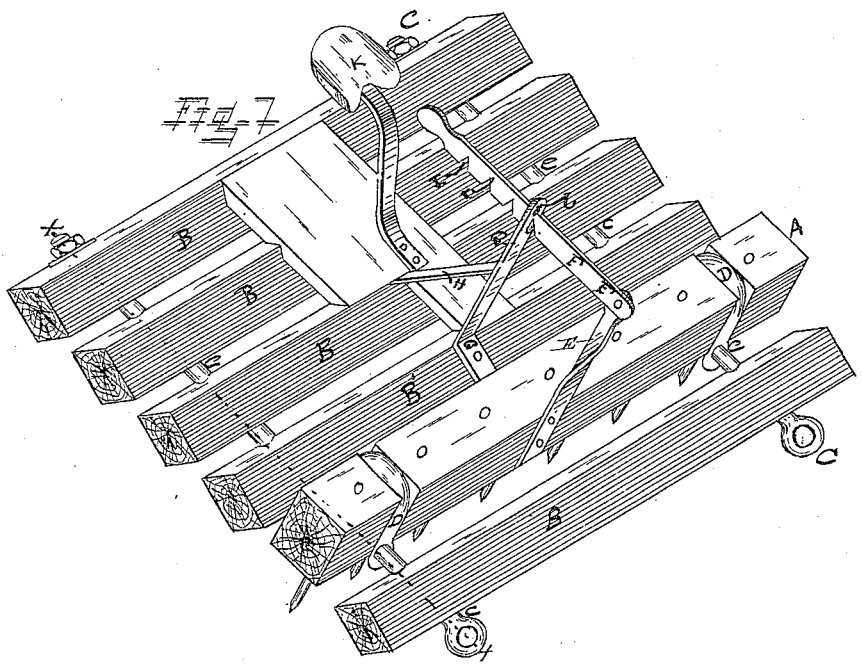
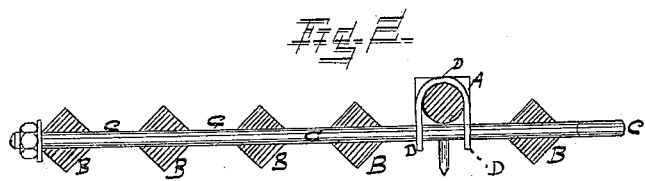
WITNESSES:
L. G. Williams
James Keef
John W Geyer INVENTOR
BY
Charles J. Barnd
his ATTORNEY

UNITED STATES PATENT OFFICE.

JOHN W. GEYER, OF WEST MILLGROVE, OHIO.

ROCKING TOOTHED HARROW AND LEVELER.

SPECIFICATION forming part of Letters Patent No. 347,791, dated August 24, 1886.

Application filed May 7, 1886. Serial No. 201,501. (No model.)

*To all whom it may concern:*

Be it known that I, JOHN W. GEYER, a citizen of the United States, residing at West Millgrove, in the county of Wood and State of Ohio, have invented certain new and useful Improvements in a Rocking Toothed Harrow and Leveler Combined; and I do hereby declare the following to be a full, clear, and exact description of the invention, which will enable others skill in the art to which it appertains to make and use the same.

Figure 1 is a perspective view. Fig. 2 is a sectional view cut upon the line *x*, showing the manner of combining and uniting the rocking toothed harrow-bar with the clodcrusher and land-leveler, which is also shown in Fig. 1.

My invention aims at making a strong, simple, and efficient union of rocking toothed harrows with wooden clod-crushers or land-levelers, and is especially applicable to that form of which is made by fastening together several wooden bars by iron rods run through holes bored into the bars, and to which it is difficult to attach and operate a movable or rocking harrow-bar, so as to retain it in place, without cumbering the machine with too much weight.

The object of this invention is to effect such a union with the least possible amount of weight, and without adding bulk to the machine, while securing the greatest degree of strength and efficiency.

It is my further object to furnish a device that will be easily operated and not liable to get out of order, and which will hold the teeth of the harrow firmly in the ground when in use, and that may be thrown out of gear with one hand.

I do not claim the form of clod-crusher to which my invention is particularly applicable; but I do regard it as the most efficient, easily made and kept in order and repaired, and I aim to add to it the use of the rocking toothed harrow, which I do not claim, broadly.

A A show the rocking toothed harrow-bar.
B B B B are wooden bars of the clod-crusher.
C C C C are iron rods passing through holes in the wooden crusher-bars, and the ends of the bent metal bars, forming boxing D D, and under the rocking toothed bars A A, and forming the support therefor. The bent bars D D pass around and fit into a groove cut around and near the ends of the bar A, so as to form a bearing or boxing, in which the bar A turns readily. The strain on the harrow-bar is upward and against the bearings when the teeth are in the ground. This form of bearing cannot be thrown out of position without breaking it, and it is not liable to be loosened by the action of the weather or exposure.

E is an upright bar or lever, securely fastened at the lower end to the upright rocking bar A, and hinged at its upper end to the toothed gravity-lever F F.

G is an upright metal post, which secures and holds the bar F F in about a horizontal position, so as to bring it within easy reach of the driver who occupies the seat K. This post also resists the strain on the levers E and F when pulled forward by the teeth when the machine is drawn over and through the ground.

H is an inclined metal brace fastened to the rear side of the post G, at the upper end, and at the lower end to the rear bars of the crusher, so as to be in the line of the greatest resistance. The post G is slotted at J, to admit the passage and secure the lever F F, and afford a hold for the notches therein.

While I do not claim this arrangement of the gravity lever and support, I describe it as the one most applicable to use in operating a rocking-bar harrow in connection with the clod-crusher heretofore described and joined by my invention; nor do I claim, broadly, the use of rocking toothed harrow-bars in connection with wooden clod-crushers.

The bars B B B and A may be kept apart by thimbles of metal or blocks, to hold them in position.

Having thus described my invention, what I do claim as my invention is—

In a harrow and clod-crusher combined, the combination of the rocking toothed bar A with the clod crusher and leveler by means of bent metal boxing D D, passing around the ends of the bar A, in suitable recess or groove cut into and near each end of said bar A, and held in position by passing the connecting-rods C C through holes near the ends of the bars D D, so as to form with the rods C C and the bars D D a strong and substantial boxing and union of the harrow and clod-crusher, substantially as described and shown, and operating as set forth.

In witness whereof I hereunto affix my signature, this 17th day of April, A. D. 1886, at Fostoria, Ohio, in the presence of two witnesses.

JOHN W. GEYER.

Witnesses:
J. M. BEVER,
L. D. MUSSETTER.